United States Patent
Sakakibara et al.

(10) Patent No.: US 11,542,382 B2
(45) Date of Patent: Jan. 3, 2023

(54) GEL-LIKE ELECTROLYTE HAVING VINYLIDENE FLUORIDE COPOLYMER

(71) Applicant: Kureha Corporation, Tokyo (JP)

(72) Inventors: Yukitaro Sakakibara, Tokyo (JP); Keisuke Watanabe, Tokyo (JP); Shota Kobayashi, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 311 days.

(21) Appl. No.: 16/493,782

(22) PCT Filed: Nov. 30, 2017

(86) PCT No.: PCT/JP2017/043067
§ 371 (c)(1),
(2) Date: Sep. 13, 2019

(87) PCT Pub. No.: WO2018/173372
PCT Pub. Date: Sep. 27, 2018

(65) Prior Publication Data
US 2021/0130572 A1    May 6, 2021

(30) Foreign Application Priority Data

Mar. 21, 2017 (JP) .............................. JP2017-055104

(51) Int. Cl.
*H01M 10/0525* (2010.01)
*C08K 3/22* (2006.01)
*H01M 10/0565* (2010.01)

(52) U.S. Cl.
CPC ........... *C08K 3/22* (2013.01); *H01M 10/0525* (2013.01); *H01M 10/0565* (2013.01); *C08K 2003/2227* (2013.01); *H01M 2300/0082* (2013.01); *H01M 2300/0085* (2013.01)

(58) Field of Classification Search
CPC ............. C08K 3/22; C08K 2003/2227; H01M 10/0525; H01M 10/0565; H01M 2300/0082; H01M 2300/0085; H01M 10/052; Y02E 60/10; C08F 214/22; C08L 27/16
USPC ........................................................ 429/303
See application file for complete search history.

(56) References Cited

U.S. PATENT DOCUMENTS

| | | |
|---|---|---|
| 5,037,922 A | 8/1991 | Kappler et al. |
| 5,173,555 A | 12/1992 | Kappler et al. |
| 5,415,958 A | 5/1995 | Takahashi et al. |
| 5,965,300 A | 10/1999 | Lee et al. |
| 6,425,996 B1 | 6/2002 | Dahms et al. |
| 9,184,461 B2 | 11/2015 | Ameduri et al. |
| 2002/0197413 A1 | 12/2002 | Daido et al. |
| 2002/0197536 A1 | 12/2002 | Mori et al. |
| 2009/0269672 A1* | 10/2009 | Takita .............. H01M 50/406 264/51 |
| 2012/0301794 A1 | 11/2012 | Koh et al. |
| 2014/0072866 A1 | 3/2014 | Kitada et al. |
| 2014/0315080 A1 | 10/2014 | Abusleme et al. |
| 2015/0017532 A1* | 1/2015 | Iguchi .................. H01M 4/623 252/182.1 |
| 2015/0147462 A1 | 5/2015 | Inaba et al. |
| 2015/0179996 A1 | 6/2015 | Inaba et al. |
| 2015/0280196 A1 | 10/2015 | Ichisaka et al. |
| 2015/0322187 A1 | 11/2015 | Miele et al. |
| 2016/0093916 A1 | 3/2016 | Moon et al. |
| 2017/0015772 A1* | 1/2017 | Watanabe ......... H01M 10/0525 |
| 2017/0288189 A1 | 10/2017 | Inaba et al. |
| 2017/0306174 A1 | 10/2017 | Inaba et al. |

(Continued)

FOREIGN PATENT DOCUMENTS

| | | |
|---|---|---|
| CN | 1393954 A | 1/2003 |
| CN | 102754267 A | 10/2012 |
| CN | 104053687 A | 9/2014 |

(Continued)

OTHER PUBLICATIONS

Office Action dated Dec. 10, 2020, in Republic of Korea Patent Application No. 10-2019-7025408.
Office Action dated Mar. 2, 2021, in Japanese Patent Application No. 2017-055104.
English translation of International Preliminary Report on Patentability and Written Opinion dated Oct. 3, 2019, in PCT/JP2017/043128.
Extended European Search Report dated Jan. 31, 2020, in European Patent Application No. 17901670.4.
International Search Report dated Feb. 20, 2018, in PCT/JP2018/043128 with English translation.

(Continued)

*Primary Examiner* — Gary D Harris
(74) *Attorney, Agent, or Firm* — Birch, Stewart, Kolasch & Birch, LLP

(57) ABSTRACT

The present invention provides a gel-like electrolyte having excellent electrolyte solution retention ability. The resin composition contains an electrolyte composition containing a solvent and an electrolyte and a vinylidene fluoride copolymer. The vinylidene fluoride copolymer is a copolymer of vinylidene fluoride and a comonomer represented by Formula (1) below, wherein $R^1$ and $R^2$ are each independently a hydrogen atom or a fluorine atom, $R^3$ is a hydrogen atom, a fluorine atom, or an alkyl group having from 1 to 5 carbons, and $R^4$ is a basic group that is capable of forming an intermolecular hydrogen bond.

[Chemical Formula 1]

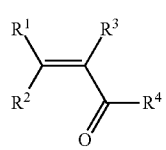

(1)

4 Claims, No Drawings

(56) References Cited

U.S. PATENT DOCUMENTS

2021/0130572 A1* 5/2021 Sakakibara ....... H01M 10/0525

FOREIGN PATENT DOCUMENTS

| | | |
|---|---|---|
| CN | 104185651 A | 12/2014 |
| CN | 104272502 A | 1/2015 |
| CN | 106103508 A | 11/2016 |
| DE | 197 58 121 A1 | 7/1999 |
| EP | 3 070 764 A1 | 9/2016 |
| JP | 7-201316 A | 8/1995 |
| JP | 2002-270236 A | 9/2002 |
| JP | 2003-59535 A | 2/2003 |
| JP | 2011-12266 A | 1/2011 |
| JP | 2012219125 A | 11/2012 |
| JP | 2013-206724 A | 10/2013 |
| JP | 2013229337 A | 11/2013 |
| JP | 2014056695 A | 3/2014 |
| JP | 2015172101 A | 10/2015 |
| JP | 2016-62835 A | 4/2016 |
| KR | 1998-079291 A | 11/1998 |
| KR | 10-0759541 B1 | 9/2007 |
| KR | 10-2016-0114110 A | 10/2016 |
| WO | WO 2004/006361 A1 | 1/2004 |
| WO | WO 2014/065258 A1 | 5/2014 |
| WO | 2016148304 A1 | 9/2016 |

OTHER PUBLICATIONS

Office Action dated Apr. 21, 2021, in Republic of Korea Patent Application No. 10-2019-7025409.
Office Action dated Aug. 4, 2021, in Chinese Patent Application No. 201780087759.X.
Office Action dated Mar. 10, 2021, in Republic of Korea Patent Application No. 10-2019-7025409.
Office Action dated Oct. 15, 2020, in Republic of Korea Patent Application No. 10-2019-7025409.
Machine translation of WO-2004/006361-A1, published on Jan. 15, 2004.
U.S. Office Action for U.S. Appl. No. 16/493,953, dated May 11, 2021.
U.S. Office Action for U.S. Appl. No. 16/493,953, dated Sep. 17, 2021.
Korean Office Action for Korean Application No. 10-2019-7025408, dated Aug. 4, 2021, with English translation.
Extended European Search Report for European Application No. 17902480.7, dated Nov. 26, 2019.
International Search Report of PCT/JP2017/043067(ISR).
English translation of International Preliminary Report on Patentability and Written Opinion dated Oct. 3, 2019, in PCT/JP2017/043067 (Forms PCT/IB/338, PCT/IB/373, and PCT/ISA/237).
Advisory Action dated Dec. 7, 2021, in U.S. Appl. No. 16/493,953.
Chinese Office Action for Chinese Application No. 20178008759.X, dated Mar. 14, 2022, with English translation.
Office Action dated Feb. 15, 2022, in Republic of Korea Patent Application No. 10-2019-7025408.
Office Action dated Apr. 22, 2022, in Chinese Patent Application No. 201780087504.3.
Office Action dated May 9, 2022, in European Patent Application No. 17 902 480.7.
Third Party Observation submitted Apr. 25, 2022, in European Patent Application No. 20170901670.
Office Action dated Jun. 6, 2022, in Chinese Patent Application No. 201780087759.X.

* cited by examiner

GEL-LIKE ELECTROLYTE HAVING VINYLIDENE FLUORIDE COPOLYMER

TECHNICAL FIELD

The present embodiment relates to a gel-like electrolyte.

BACKGROUND ART

Lithium-ion secondary batteries have high energy density, and therefore are used not only in the power source of portable devices, but also in various applications such as hybrid electric vehicles and electric vehicles. In addition, as fields of application have been expanded, a lithium-ion secondary battery is required to have a smaller size and lighter weight, and enhanced safety.

Recently, as a method of making a lithium-ion secondary battery smaller and lighter and as a method to enhance the safety of a lithium-ion secondary battery, a method of using a gel-like electrolyte as the electrolyte is drawing attention. A gel-like electrolyte is an electrolyte that consists of a polymer and an electrolyte solution. However, because a polymer is generally an insulator, there is a problem that the ionic conductivity of a gel-like electrolyte to which the polymer is added decreases.

As a method for suppressing reduction of ionic conductivity, for example, Patent Document 1 discloses a secondary battery having a gel-like electrolyte and having an adhesive layer containing a polar group and a polymer chain. Furthermore, Patent Document 2 discloses a vinylidene fluoride-based copolymer containing a fluorine-based monomer and a particular compound, and discloses a gel-like electrolyte that enables the electrolyte solution to be maintained as a solid, i.e., a gel-like electrolyte having electrolyte solution retention ability.

Furthermore, it is known that, as a polymer used in a lithium-ion secondary battery, polyvinylidene fluoride can be used as a binder for a lithium-ion secondary battery (Patent Documents 3 and 4).

CITATION LIST

Patent Document

Patent Document 1: JP 2014-056695 A
Patent Document 2: JP 2015-172101 A
Patent Document 3: JP 2013-229337 A
Patent Document 4: JP 2012-219125 A

SUMMARY OF INVENTION

Technical Problem

In both the gel-like electrolyte described in Patent Document 1 and the gel-like electrolyte described in Patent Document 2, reduction of ionic conductivity of the electrolyte can be suppressed to a certain extent; however, further improvement is demanded for ensuring electrolyte solution retention ability.

The gel-like electrolyte according to an embodiment of the present invention is completed in light of problems described above. An object of the present invention is to provide a gel-like electrolyte having excellent electrolyte solution retention ability.

Solution to Problem

To solve the problems described above, a gel-like electrolyte according to an embodiment of the present invention contains an electrolyte composition containing a solvent and an electrolyte and a vinylidene fluoride copolymer. The vinylidene fluoride copolymer is a copolymer of vinylidene fluoride and a comonomer represented by Formula (1) below.

[Chemical Formula 1]

(1)

wherein, $R^1$ and $R^2$ are each independently a hydrogen atom or a fluorine atom, $R^3$ is a hydrogen atom, a fluorine atom, a chlorine atom, or an alkyl group having from 1 to 5 carbons, and $R^4$ is a basic group that is capable of forming an intermolecular hydrogen bond.

Advantageous Effects of Invention

According to the gel-like electrolyte of an embodiment of the present invention, a gel-like electrolyte having excellent liquid retention properties for an electrolyte solution can be obtained.

DESCRIPTION OF EMBODIMENTS

The gel-like electrolyte according to an embodiment of the present invention will be described below.

Gel-Like Electrolyte

The gel-like electrolyte of the present embodiment contains an electrolyte composition containing a solvent and an electrolyte, and a vinylidene fluoride copolymer. The vinylidene fluoride copolymer contains a structural unit derived from the comonomer represented by Formula (1) in addition to a vinylidene fluoride structural unit.

Vinylidene Fluoride Copolymer

The vinylidene fluoride copolymer of the present embodiment contains a vinylidene fluoride structural unit and a structural unit derived from the comonomer represented by Formula (1) (hereinafter, simply also referred to as a basic comonomer). Furthermore, the vinylidene fluoride copolymer of the present embodiment may contain a structural unit derived from a fluorine atom-containing comonomer that is different from the vinylidene fluoride and the basic comonomer (hereinafter, simply referred to as "fluorine-containing monomer") and another structural unit derived from another monomer in the range that does not impair the effect of the present embodiment, in addition to the vinylidene fluoride structural unit and the structural unit derived from a basic comonomer.

[Chemical Formula 2]

(1)

wherein, $R^1$ and $R^2$ in Formula (1) are each independently a hydrogen atom or a fluorine atom. Among these, at least one of $R^1$ or $R^2$ is preferably a hydrogen atom, and the both $R^1$ and $R^2$ are more preferably hydrogen atoms.

$R^3$ is a hydrogen atom, a fluorine atom, a chlorine atom, or an alkyl group having from 1 to 5 carbons. Examples of the alkyl group having from 1 to 5 carbons include a methyl group, an ethyl group, a propyl group, an isopropyl group, a butyl group, an isobutyl group, a sec-butyl group, a tert-butyl group, a pentyl group, a 2-methylbutyl group, a 3-methylbutyl group, a 2,2-dimethylpropyl group, and the like. Among these, $R^3$ is preferably a hydrogen atom, a fluorine atom, a chlorine atom, or a methyl group, and more preferably a hydrogen atom or a fluorine atom.

$R^4$ is a basic group that is capable of forming an intermolecular hydrogen bond. The basic group of the present embodiment is a Brønsted base, that is, $R^4$ is a functional group that can accept a proton.

The basic group in the present embodiment is particularly preferably a basic group containing a nitrogen atom. The nitrogen atom-containing functional group may be a straight functional group or a functional group having a cyclic structure. Examples of the nitrogen atom-containing functional group include a pyridyl group, an amide group, and an amino group. Among these nitrogen atom-containing functional groups, an amino group or an amide group is more preferred.

Examples of the amide include —$CONR^5R^6$, and $R^5$ is a hydrogen atom or an alkyl group having 1 or 2 carbons, and more preferably a hydrogen atom. $R^6$ is an atomic group having from 1 to 10 main chain atoms and having a molecular weight of 500 or less, and is more preferably an atomic group having from 1 to 5 atoms and a molecular weight of 250 or less.

Examples of the compound represented by Formula (1) include, but not particularly limited to, (meth)acrylamide, N-methyl(meth)acrylamide, N-isopropyl(meth)acrylamide, N-tert-butyl(meth)acrylamide, N-phenyl(meth)acrylamide, N-methoxymethyl(meth)acrylamide, N-butoxymethyl(meth)acrylamide, 4-acryloylmorpholine, diacetone(meth)acrylamide, N,N-dimethyl(meth)acrylamide, N,N-diethyl(meth)acrylamide, 2-(meth)acrylamide-2-methylpropane sulfonic acid, aminomethyl acrylate, 2-aminoethyl acrylate, 3-aminopropyl acrylate, methylaminomethyl acrylate, 2-(methylamino)ethyl acrylate, 3-(methylamino)propyl acrylate, dimethylaminomethyl acrylate, 2-(dimethylamino)ethyl acrylate, 3-(dimethylamino)propyl acrylate, and the like.

Fluorine-Containing Monomer

The fluorine-containing monomer is not particularly limited as long as the fluorine-containing monomer contains fluorine and is copolymerizable with the vinylidene fluoride and the compound represented by Formula (1), and examples thereof include vinyl fluoride, trifluoroethylene (TrFE), tetrafluoroethylene (TFE), chlorotrifluoroethylene (CTFE), hexafluoropropylene (HFP), and the like. The fluorine-containing monomer may be used alone, or a combination of two or more types of the fluorine-containing monomers may be used. In the present embodiment, in the case where a fluorine-containing monomer is contained, HFP or CTFE is preferred from the perspective of polymerization reactivity.

Other Monomer

Examples of other monomer except the vinylidene fluoride, the basic comonomer, and the fluorine-containing monomer include hydrocarbon-based monomers, such as ethylene and propylene, acrylate-based monomers, and vinyl ether-based monomers. Furthermore, one type of these other monomers may be used alone, or two or more types may be used.

Vinylidene Fluoride Copolymer

The vinylidene fluoride copolymer in the present embodiment contains the vinylidene fluoride as a main component. The content of the vinylidene fluoride structural unit in the vinylidene fluoride copolymer is preferably from 99.9 mol % to 80 mol %, more preferably from 99.9 mol % to 90 mol %, and particularly preferably from 99.9 mol % to 95 mol %, relative to a total monomer amount of 100 mol %.

The content of the structural unit of the basic comonomer in the vinylidene fluoride copolymer is preferably from 0.1 mol % to 10 mol %, more preferably from 0.1 mol % to 5 mol %, and particularly preferably from 0.1 mol % to 1 mol %, relative to a total monomer amount of 100 mol %. The effect of enhancing electrolyte solution retention ability can be achieved by setting the monomer structure to the range described above.

In the case where the fluorine-containing monomer is contained in the vinylidene fluoride copolymer, the content of the structural unit of the fluorine-containing monomer in the vinylidene fluoride copolymer is preferably from 0.1 mol % to 20 mol %, more preferably from 0.5 mol % to 10 mol %, and particularly preferably from 1 mol % to 5 mol %, relative to a total monomer amount of 100 mol %.

The content ratio of the structural units in the vinylidene fluoride copolymer can be determined from IR spectrum analysis and the like. For example, by IR spectrum, a ratio between the amount of the structural unit derived from the basic comonomer to the amount of the structural unit derived from the vinylidene fluoride is determined. From this ratio, the amount of the structural unit derived from the vinylidene fluoride and the amount of the structural unit derived from the basic comonomer can be calculated.

Method for Producing Vinylidene Fluoride Copolymer

The method for producing the vinylidene fluoride copolymer of the present embodiment is not particularly limited as long as the method copolymerizes the vinylidene fluoride and the basic comonomer, and production can be performed by a known method. Examples thereof include a method in which polymerization is performed by using only the vinylidene fluoride and then the basic comonomer is reacted thereto, a method in which polymerization is performed by using only the basic comonomer and then the vinylidene fluoride is reacted thereto, a method in which a product obtained by polymerizing only the vinylidene fluoride and a product obtained by polymerizing only the basic comonomer are reacted to bond each other, and a method in which the vinylidene fluoride and the basic comonomer are directly reacted. Among these, a method in which the vinylidene fluoride and the basic comonomer are directly reacted is preferred from the perspective of simplicity. Examples of the method in which the vinylidene fluoride and the basic comonomer are directly reacted include a method described in Patent Document 2. Specific examples include a method in which the basic comonomer is added in portions or continuously to the vinylidene fluoride to polymerize. The type of the polymerization reaction is not particularly limited, and suspension polymerization, emulsion polymerization, solution polymerization, and the like can be employed. From the perspective of ease in post-treatment and the like, suspension polymerization in an aqueous system and emulsion polymerization are preferred, and suspension polymerization in an aqueous system is particularly preferred.

Physical Properties of Vinylidene Fluoride Copolymer

The vinylidene fluoride copolymer of the present embodiment has an inherent viscosity of a value preferably in a range from 1.0 to 10.0 dL/g, and more preferably in a range from 1.5 to 7.0 dL/g. By setting the inherent viscosity to the range described above, superior productivity, solubility, and gel strength can be achieved. Note that the inherent viscosity in the present specification refers to a logarithmic viscosity at 30° C. of a solution obtained by dissolving 4 g of a resin in 1 liter of N,N-dimethylformamide. More specifically, the inherent viscosity $\eta_i$ can be calculated based on the following equation, by dissolving 80 mg of the vinylidene fluoride copolymer in 20 mL of N,N-dimethylformamide, and using an Ubbelohde viscometer in a 30° C. thermostatic bath.

$$\eta_i=(1/C)\cdot \ln(\eta/\eta_0)$$

Here, $\eta$ is the viscosity of the polymer solution, $\eta_0$ is the viscosity of N,N-dimethylformamide (solvent) alone, and C is 0.4 g/dL.

Electrolyte Composition

The electrolyte composition may use a substance obtained by dissolving an electrolyte in, for example, a non-aqueous solvent, and may contain other materials, such as additives, as needed.

Non-Aqueous Solvent

The non-aqueous solvent is not particularly limited as long as the non-aqueous solvent dissolves the electrolyte. Examples thereof include propylene carbonate, ethylene carbonate, 1,2-dimethoxyethane, 1,2-diethoxyethane, dimethyl carbonate, diethyl carbonate, ethyl methyl carbonate, γ-butyrolactone, methyl propionate, ethyl propionate, and the like. One type of the non-aqueous solvents may be used alone, or a mixture of two or more types may be used. From the perspective of electrochemical physical properties, the non-aqueous solvent is preferably ethylene carbonate, propylene carbonate, diethyl carbonate, γ-butyrolactone, or ethyl methyl carbonate, and is particularly preferably ethylene carbonate and propylene carbonate.

Electrolyte

An electrolyte is a substance that imparts ionic conductivity by being dissolved in a non-aqueous solvent and that can conduct electricity to the non-aqueous solvent. Examples of the electrolyte of the present embodiment include lithium salts. Example of the lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate (LiB$(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), lithium hexafluorosilicate ($Li_2SiF_6$), lithium chloride (LiCl), and lithium bromide (LiBr). These lithium salts are preferred because excellent battery capacity, cycle characteristics, storage characteristics, and the like can be achieved. As the electrolyte, one type of the lithium salts may be used alone, or two or more types may be used. Furthermore, in addition to these lithium salts, for example, other salts except the lithium salts, such as light metal salts except the lithium salts, may be contained. Among the lithium salts described above, from the perspectives of reducing internal resistance and achieving superior effect, use of one type of or two or more types of $LiPF_6$, $LiBF_4$, $LiClO_4$, and $LiAsF_6$ is particularly preferred, and use of $LiPF_6$ is more preferred.

The content of the electrolyte is preferably from 0.1 to 5 mol/kg, more preferably from 0.3 to 4 mol/kg, and even more preferably from 0.5 to 2 mol/kg, relative to the amount of the solvent. Setting the content of the electrolyte to the range described above is preferred because high ionic conductivity can be achieved.

Other Additive

The electrolyte composition in the present embodiment may contain various additives, such as inorganic particles, plasticizers, and dispersing agents.

As the inorganic particles, inorganic fillers that are typically used in a resin film provided between a separator and a positive electrode or a negative electrode of a non-aqueous electrolyte secondary battery can be used without limitation for the electrolyte composition of the present embodiment. Inorganic particles are typically thermally stable components. By allowing such inorganic particles to be contained in the gel-like electrolyte, the gel-like electrolyte according to the present embodiment tends to maintain the shape.

Examples of the inorganic particles include $SrTiO_3$, $SnO_2$, $CeO_2$, MgO, NiO, CaO, ZnO, $ZrO_2$, $Y_2O_3$, $Al_2O_3$, $TiO_2$, $SiO_2$, SiC, clay minerals, mica, calcium carbonate, and the like. One type of these may be used alone, or two or more types may be used. From the perspective of safety of battery and stability of coating fluid, the inorganic particles are preferably $Al_2O_3$, MgO, $SiO_2$, or ZnO. From the perspectives of insulating properties and electrochemical stability, the inorganic particles are more preferably $Al_2O_3$.

The average particle size of the inorganic particles is preferably from 5 nm to 2 μm, and more preferably from 10 nm to 1 μm.

Examples of the plasticizer include dimethyl carbonate, tetrahydrofuran, acetone, and the like. In the present embodiment, from the perspectives of solubility and volatility, dimethyl carbonate or acetone is preferred, and dimethyl carbonate is more preferred. Blending of the plasticizer in the gel-like electrolyte can suppress the crystallinity of the polymer molecular chain in the non-aqueous electrolyte secondary battery and can enhance mobility of the polymer molecular chain.

Gel-Like Electrolyte

The gel-like electrolyte according to the present embodiment contains the vinylidene fluoride copolymer and the electrolyte composition.

The gel-like electrolyte of the present embodiment contains from 1 to 20 mass %, preferably from 1 to 10 mass %, and more preferably from 2 to 8 mass %, of the vinylidene fluoride copolymer.

Furthermore, the gel-like electrolyte of the present embodiment contains from 80 to 99 mass %, preferably from 90 to 99 mass %, and more preferably from 92 to 98 mass %, of the electrolyte composition.

Method for Producing Gel-Like Electrolyte

The gel-like electrolyte of the present embodiment is, for example, formed from the vinylidene fluoride copolymer and the electrolyte composition according to the present embodiment as described below. An example thereof is a method for obtaining a gel-like electrolyte by mixing a vinylidene fluoride copolymer, an electrolyte composition, and a volatile organic solvent, and then performing a process of volatilizing the volatile organic solvent from the obtained mixture. As another method, the vinylidene fluoride copolymer and the volatile organic solvent are mixed to prepare a solution in which the vinylidene fluoride copolymer is dissolved. The solution and an electrolyte composition are then mixed. A process of volatilizing the volatile organic solvent from the obtained mixture is then performed to obtain a gel-like electrolyte. Note that, the mixing can be performed in a heating condition, and preferably performed at from 40 to 150° C. Furthermore, the process of volatilizing the volatile organic solvent is preferably performed at from 0 to 100° C., and more preferably at from 10 to 80° C.

As the volatile organic solvent used during the production of the gel-like electrolyte, a volatile organic solvent that has a high vapor pressure at a low temperature and that dissolves the vinylidene fluoride copolymer well is suitably used. The volatile organic solvent is not particularly limited. Specifically, tetrahydrofuran, methyltetrahydrofuran, acetone, methyl ethyl ketone, 1,3-dioxolane, cyclohexanone, dimethyl carbonate, and the like are used. Among these, by using propylene carbonate, ethylene carbonate, and dimethyl carbonate, which are non-aqueous solvents, and the like, these solvents can be used as a solvent for the vinylidene fluoride copolymer. This can make the gel-like electrolyte without no additional volatile organic solvent.

The gel-like electrolyte in the present embodiment may be sheet-like or block-like. In the case where the gel-like electrolyte is sheet-like, the thickness is preferably from 0.1 to 1000 μm, and more preferably from 0.5 to 200 μm.

Non-Aqueous Battery

The gel-like electrolyte of the present embodiment can be used in a non-aqueous battery. The non-aqueous battery of the present embodiment is typically a non-aqueous secondary battery, such as a lithium-ion secondary battery.

The structure of the non-aqueous secondary battery of present embodiment is not particularly limited except for the fact that the gel-like electrolyte of the present embodiment is used as the electrolyte, and may be a known non-aqueous secondary battery structure.

The non-aqueous battery in the present embodiment has, as components other than the gel-like electrolyte, a positive electrode formed from a current collector and a positive electrode mixture layer, and a negative electrode formed from a current collector and a negative electrode mixture, and the gel-like electrolyte according to the present embodiment is arranged in between the positive electrode and the negative electrode. The gel-like electrolyte may be prepared separately from the positive electrode and the negative electrode and then laminated, or may be directly prepared on the positive electrode and/or the negative electrode.

Since the gel-like electrolyte of the present embodiment is a gel-like electrolyte having excellent liquid retention properties for an electrolyte solution, in a non-aqueous secondary battery using the gel-like electrolyte of the present embodiment, the amount of the polymer to be used in the gel-like electrolyte can be reduced. This decreases the resistance of the battery and output characteristics of the non-aqueous secondary battery can be enhanced.

Embodiments of the present invention will be described in further detail hereinafter using examples. The present invention is not limited to the examples below, and it goes without saying that various aspects are possible with regard to the details thereof. Furthermore, the present invention is not limited to the embodiments described above, and various modifications are possible within the scope indicated in the claims. Embodiments obtained by appropriately combining the technical means disclosed by the embodiments are also included in the technical scope of the present invention. In addition, all of the documents described in the present specification are herein incorporated by reference.

SUMMARY

The gel-like electrolyte according to an embodiment of the present invention contains an electrolyte composition containing a solvent and an electrolyte and a vinylidene fluoride copolymer. The vinylidene fluoride copolymer is a copolymer of vinylidene fluoride and a comonomer represented by Formula (1) below.

[Chemical Formula 3]

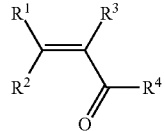

wherein, $R^1$ and $R^2$ are each independently a hydrogen atom or a fluorine atom, $R^3$ is a hydrogen atom, a fluorine atom, a chlorine atom, or an alkyl group having from 1 to 5 carbons, and $R^4$ is a basic group that is capable of forming an intermolecular hydrogen bond.

Furthermore, in the gel-like electrolyte according to an embodiment of the present invention, a content of a structural unit derived from the comonomer represented by Formula (1) above in the vinylidene fluoride copolymer is preferably from 0.1 mol % to 10 mol % relative to a total monomer amount of 100 mol %.

Furthermore, in the gel-like electrolyte according to an embodiment of the present invention, $R^4$ in Formula (1) above is preferably a nitrogen atom-containing functional group.

Furthermore, in the gel-like electrolyte according to an embodiment of the present invention, the nitrogen atom-containing functional group is preferably amine or amide.

Furthermore, in the gel-like electrolyte according to an embodiment of the present invention, the vinylidene fluoride copolymer may be a copolymer of the vinylidene fluoride, the comonomer represented by Formula (1) above, and a fluorine atom-containing comonomer that is different from the comonomer.

EXAMPLES

Example 1

Production of Vinylidene Fluoride Copolymer

In an autoclave with an internal volume of 2 liters, 1060 g of ion-exchanged water, 0.6 g of Metolose SM-100 (available from Shin-Etsu Chemical Co., Ltd.) as a suspending agent, 0.1 g of acrylamide (available from Kanto Chemical Co., Inc.), 3.28 g of 50 wt. % di-i-propyl peroxy dicarbonate (IPP)-Freon 225cb solution as a polymerization initiator, 0.5 g of ethyl acetate (available from Kanto Chemical Co., Inc.) as a chain transfer agent, 370 g of vinylidene fluoride (VDF), and 40 g of hexafluoropropylene (HFP) were charged, and the temperature was increased to 29° C. A 5 wt. % acrylamide aqueous solution was then gradually added at a rate of 0.1 g/min while the temperature was maintained at 29° C. The total amount of 4.1 g (including the initially added amount) (0.29 mol % relative to the total amount of monomer) of acrylamide was added. Polymerization was performed for a total of 18 hours from the start of temperature increase. After polymerization was ended, the polymer slurry was heat-treated for 60 minutes at 95° C. The polymer slurry was then filtered, washed with water, and dried at 80° C. for 20 hours to obtain a vinylidene fluoride copolymer.

The inherent viscosity of the obtained polymer was 1.86 dL/g. Furthermore, based on the IR spectrum, the $A_{C=O}/A_{C-H}$ of the obtained vinylidene fluoride copolymer was 0.22.

Production of Gel-Like Electrolyte

Ethylene carbonate and propylene carbonate were mixed at a mass ratio of 3:2 to obtain a non-aqueous solvent. In the obtained non-aqueous solvent, lithium hexafluorophosphate was dissolved to form the concentration of 1 mol/L, and thus an electrolyte composition was prepared. A mixture was prepared by adding 1.5 g of vinylidene fluoride copolymer, 100 g of dimethyl carbonate as a plasticizer, and alumina to 40 g of the electrolyte composition, and heating and agitating. The mixture was placed in a cylindrical container, and the plasticizer was removed to obtain a gel-like electrolyte.

Evaluation Test for Liquid Retention Properties

The gel-like electrolyte was cut out into an appropriate size to make a test piece. The pressure of 30 kPa was applied to the test piece of the gel-like electrolyte, whose weight was measured in advance, and maintained for 20 minutes. After the weight was removed, the exuded electrolyte solution on the gel surface was wiped. The weight of the test piece was measured, and the weight maintenance percentage for the liquid retention properties (wt. %) was calculated as a relative value relative to the weight before the test, based on the following equation.

Weight maintenance percentage for liquid retention properties=[(weight of gel after application of load)/(weight of gel before application of load)]×100

The weight maintenance percentage for the liquid retention properties in the evaluation test for liquid retention properties of the obtained gel-like electrolyte was 69%. Furthermore, the physical properties and the composition of the obtained vinylidene fluoride copolymer are shown in Table 1.

Example 2

A gel-like electrolyte was obtained in the same manner as in Example 1 except for changing the charged amount of the acrylamide of Example 1 to 0.55 mol %. As a result of performing the evaluation test for the liquid retention properties in the same manner as in Example 1, the weight maintenance percentage for the liquid retention properties of the obtained gel-like electrolyte was 70%. Furthermore, the physical properties and the composition of the obtained vinylidene fluoride copolymer are shown in Table 1.

Comparative Example 1

A gel-like electrolyte was obtained in the same manner as in Example 1 except for changing the acrylamide of Example 1 to monomethyl maleate and changing the charged amount thereof to 0.27 mol %. As a result of performing the evaluation test for the liquid retention properties in the same manner as in Example 1, the weight maintenance percentage for the liquid retention properties of the obtained gel-like electrolyte was 64%. Furthermore, the physical properties and the composition of the obtained vinylidene fluoride copolymer are shown in Table 1.

Comparative Example 2

A gel-like electrolyte was obtained in the same manner as in Example 1 except for changing the acrylamide of Example 1 to acryloyloxypropyl succinate (APS) and changing the charged amount thereof to 0.27 mol %. As a result of performing the evaluation test for the liquid retention properties in the same manner as in Example 1, the weight maintenance percentage for the liquid retention properties of the obtained gel-like electrolyte was 64%. Furthermore, the physical properties and the composition of the obtained vinylidene fluoride copolymer are shown in Table 1.

Comparative Example 3

A vinylidene fluoride copolymer was prepared by polymerization without adding acrylamide of Example 1. To this, 0.3 wt. % of polyacrylamide (available from Sigma-Aldrich) was added to prepare a polymer mixture. A gel-like electrolyte was obtained in the same manner as in Example 1 except for using the polymer mixture in place of the vinylidene fluoride copolymer. As a result of performing the evaluation test for the liquid retention properties in the same manner as in Example 1, the weight maintenance percentage for the liquid retention properties of the obtained gel-like electrolyte was 62%.

As is clear from Table 1, the gel-like electrolyte of each of Examples exhibited higher weight maintenance percentage for the liquid retention properties and superior liquid retention properties compared to those of Comparative Examples.

TABLE 1

| | Charged amount (mol %) | | | Comonomer | Inherent viscosity | IR intensity ratio AC = | Weight maintenance percentage for liquid retention |
|---|---|---|---|---|---|---|---|
| | VDF | HFP | Co-monomer | type | (dL/g) | O/AC − H | properties (%) |
| Example 1 | 95.4 | 4.3 | 0.29 | Acrylamide | 1.86 | 0.22 | 69 |
| Example 2 | 95.2 | 4.3 | 0.55 | Acrylamide | 1.84 | 0.33 | 70 |
| Comparative Example 1 | 95.4 | 4.3 | 0.27 | Monomethyl maleate | 2.00 | 0.36 | 64 |
| Comparative Example 2 | 95.4 | 4.3 | 0.27 | APS | 2.23 | 0.44 | 64 |

INDUSTRIAL APPLICABILITY

The gel-like electrolyte of an embodiment of the present invention can be suitably used as an electrolyte of a non-aqueous battery.

The invention claimed is:

1. A gel-like electrolyte comprising an electrolyte composition containing a solvent and an electrolyte, and a vinylidene fluoride copolymer,
    wherein the vinylidene fluoride copolymer is a copolymer of vinylidene fluoride, a first comonomer represented by Formula (1) below, and hexafluoropropylene; and wherein a content of a vinylidene fluoride structural unit in the vinylidene fluoride copolymer is from 99.9 mol % to 95 mol % relative to a total monomer amount of 100 mol %:

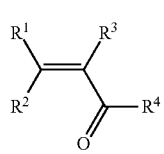

(1)

wherein in Formula (I), $R^1$ and $R^2$ are each independently a hydrogen atom or a fluorine atom, $R^3$ is a hydrogen atom, a fluorine atom, a chlorine atom, or an alkyl group having from 1 to 5 carbons, and $R^4$ is a basic group that is capable of forming an intermolecular hydrogen bond.

2. The gel-like, electrolyte according to claim 1, wherein a content of a structural unit derived from the first comonomer represented by the Formula (1) in the vinylidene fluoride copolymer is from 0.1 mol % to 1 mol % relative to a total monomer amount of 100 mol %.

3. The gel-like electrolyte according to claim 1, wherein $R^4$ in the Formula (1) is a nitrogen atom-containing functional group.

4. The gel-like electrolyte according to claim 3, wherein the nitrogen atom-containing functional group is an amino group or an amide group.

* * * * *